Dec. 18, 1951     A. L. KRONQUEST     2,578,815
APPARATUS FOR VACUUMIZING, GASSING, AND CLOSING CONTAINERS
Filed Dec. 20, 1946     10 Sheets-Sheet 1

Inventor
Alfred L. Kronquest,
By Mason, Porter, Diller & Stewart
Attorneys.

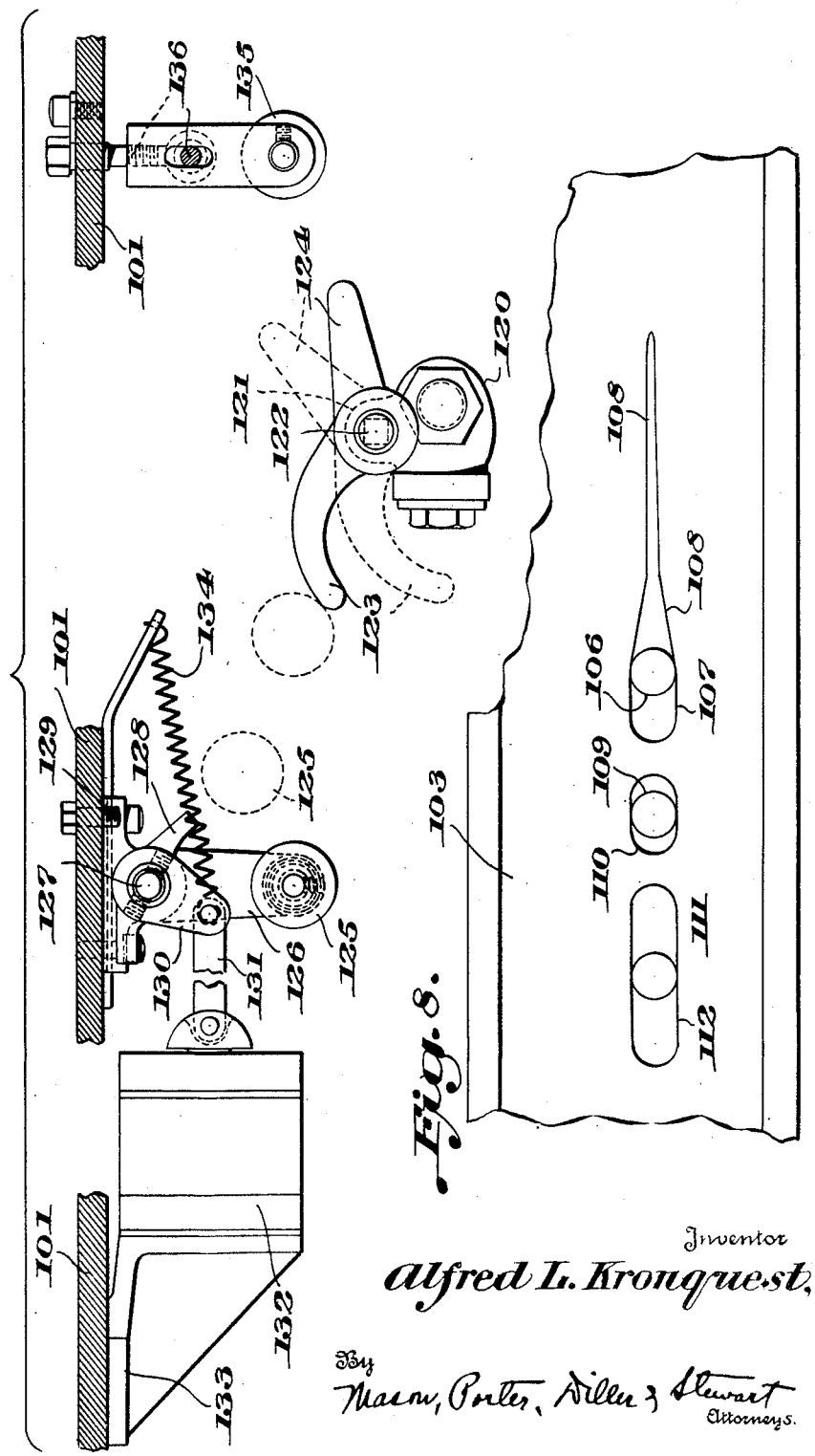

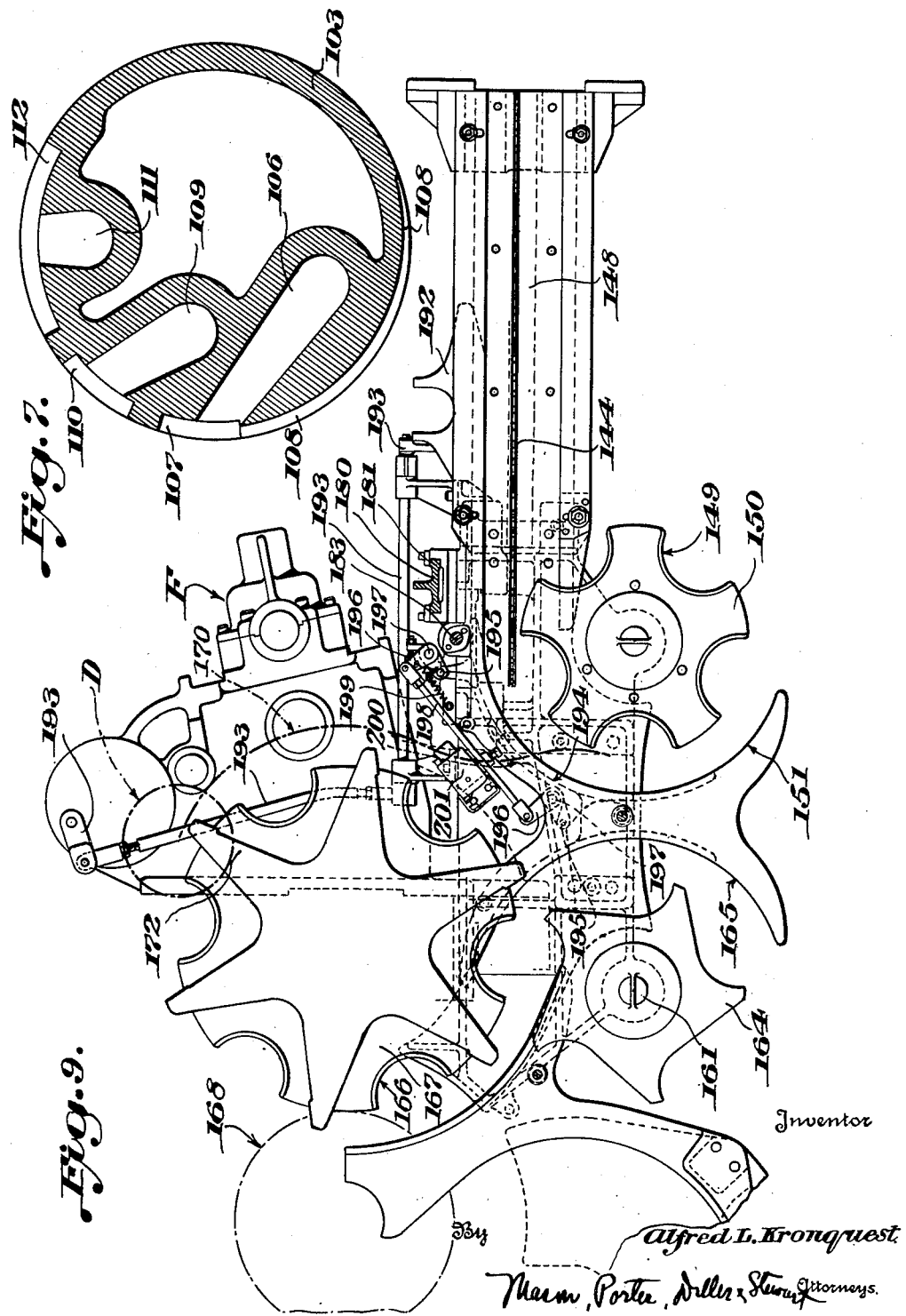

Dec. 18, 1951     A. L. KRONQUEST     2,578,815
APPARATUS FOR VACUUMIZING, GASSING, AND CLOSING CONTAINERS
Filed Dec. 20, 1946     10 Sheets-Sheet 8

Inventor
Alfred L. Kronquest,
By Munn, Porter, Diller & Stewart Attorneys

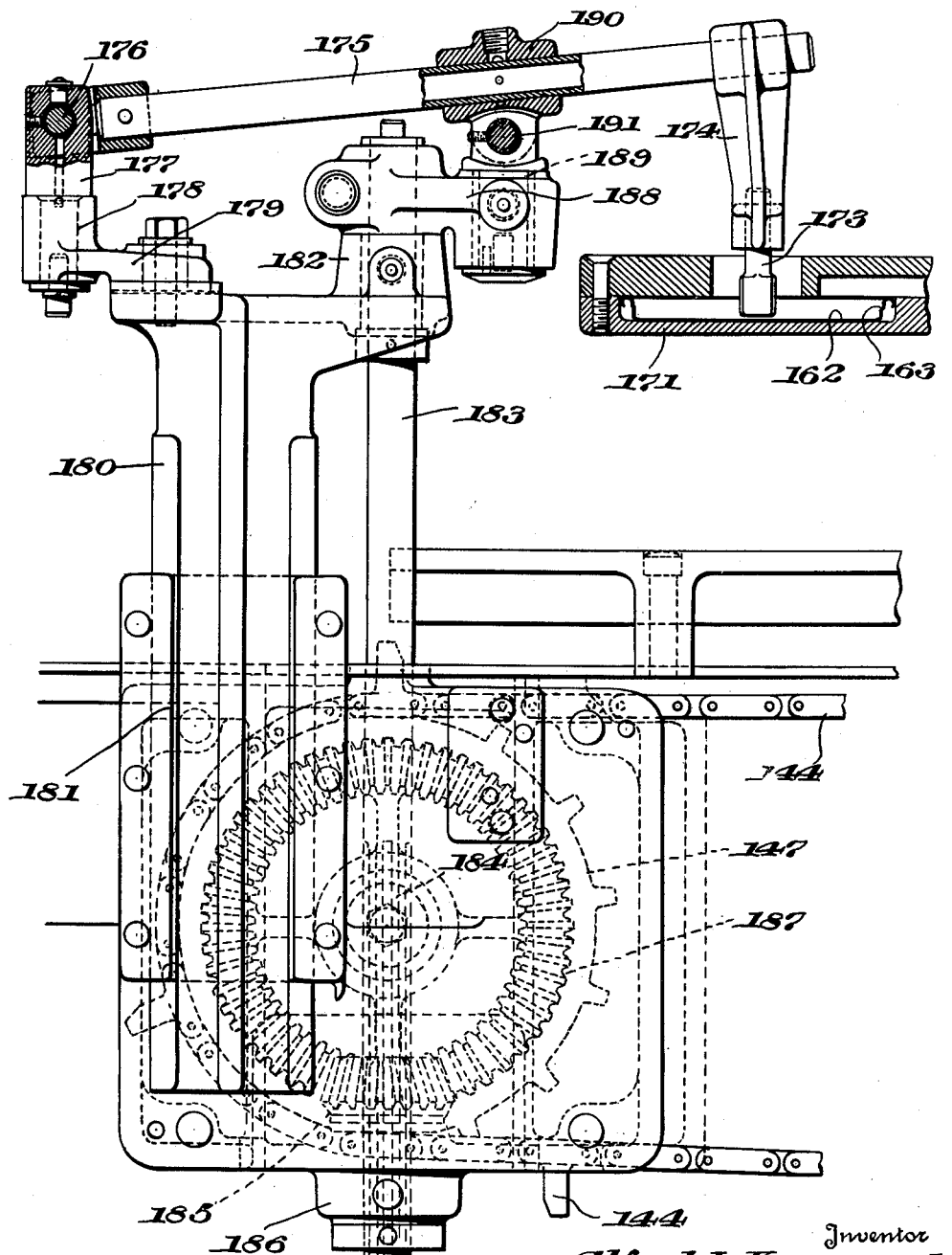

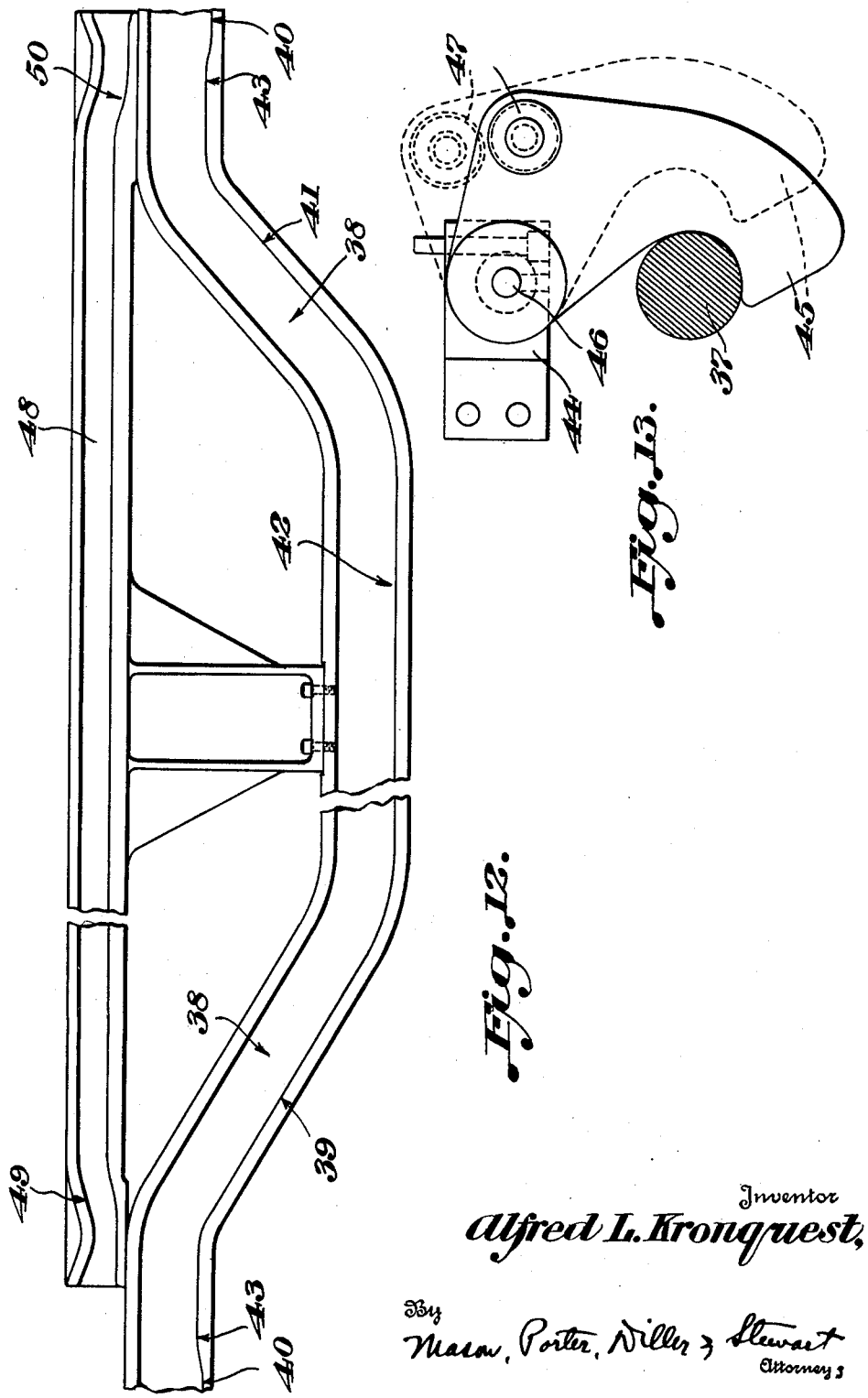

UNITED STATES PATENT OFFICE 2,578,815

APPARATUS FOR VACUUMIZING, GASSING, AND CLOSING CONTAINERS

Alfred L. Kronquest, Syracuse, N. Y., assignor to Continental Can Company, Inc., New York, N. Y., a corporation of New York Application December 20, 1946, Serial No. 717,446

27 Claims. (Cl. 226—82)

The invention relates generally to apparatus for vacuumizing, gassing and closing containers, particularly those in which coffee or comparable powdery substances are packaged for the market, and it primarily seeks to provide a novel apparatus capable of vacuumizing and gassing such containers rapidly and efficiently.

Vacuumizing, gassing and closing machines are known to workers in the art, but conventional machine structures have not been entirely satisfactory for various reasons. Difficulties have been experienced in drawing a high vacuum in containers with coffee or comparable powdery substances therein because bits of coffee or the like have been drawn into the spaces between the container and cover flanges with the result that in the double seaming attachment of the covers leaky seams have been provided. When the vacuumizing and gassing operations have been performed in one machine and the open containers have been fed to a second machine to be closed therein the vacuumized and gassed condition of the containers has been disturbed in the atmosphere during the transferring of the containers between machines. When attempts have been made to perform all three operations in a single machine, namely the vacuumizing, gassing and closing of the containers, the machines have been made objectionably cumbersome and also slow in operation. It is a purpose of the present invention to provide a novel composite machine structure in which all of the problems referred to are avoided.

An object of the invention is to provide a novel combination of a vacuumizing and gassing machine and a closing machine with means in the former for effecting a tight friction temporary closure of the containers, thereby to avoid the disturbing of the vacuumized and gassed condition in the containers as they are being fed from the first mentioned machine into the closing machine and provide for more rapid and efficient vacuumizing, gassing and closing than has been possible heretofore.

Another object of the invention is to provide a novel machine combination of the character stated in which the closing machine is of standard form including a cover feed, cover marking means when such is employed, and container feeding means, and in which means is provided for diverting containers from said container feeding means into the vacuumizing and gassing machine, and also means for delivering covers from said cover feed onto containers as they are being moved into the last mentioned machine, and means for transferring the vacuumized and gassed containers from the vacuumizing and gassing machine into the closing machine for final double seam sealing therein after a temporary tight friction closure thereof has been effected in said vacuumizing and gassing machine.

Another object of the invention is to provide novel vacuumizing and gassing machine structure in which means is provided for gradually drawing a relatively low vacuum in the containers in a first stage from an individual source, and then a relatively high vacuum in the partially vacuumized containers in a second stage from a second individual source.

Another object of the invention is to provide in a machine structure of the character stated a rotary turret, a plurality of container treating bells and complementary container supporting pads, means for bringing the pads and bells together to enclose containers therein with covers resting loosely thereon, means for lifting the covers from the containers while they are being treated in the closed bells, and means for forcing the covers into tight temporary friction closure fit in the containers while they are in the closed bells and after treatment thereof.

Another object of the invention is to provide machine structure of the character stated in which the cover lifting and closing means in each bell comprises a vertically reciprocable chuck having provision for engaging and pressing downwardly on a cover, and a plurality of gripper fingers carried by the chuck and engageable with the periphery of a cover.

Another object of the invention is to provide machine structure of the character stated in which the cover gripping fingers in each bell have hook portions engageable under the peripheral edges of covers, and in which spring pin means is provided on each chuck and effective during lifting and holding of covers to yieldably press them against said finger hook portions.

Another object of the invention is to provide machine structure of the character stated in which means is provided in each bell for varying the internal diameter and depth of the treating chamber so as to accommodate containers of different sizes and provide for a minimum of space surrounding the same.

Another object of the invention is to provide a container treating bell structure of the character stated in which is included a ceiling plate means through which the chuck supporting rod reciprocates and which has provision for engaging in sealing contact with the internal wall of the bell intermediately of the top and bottom thereof, a spacer sleeve surrounding the chuck rod and which is of selective length for determining the position of the ceiling plate means, and ring means below the ceiling plate means selective as to length according to the desired spacing of the ceiling plate means above the bottom of the bell, and as to internal diameter for selectively varying the diameter of the treating chamber within the bell.

Another object of the invention is to provide machine structure of the character stated wherein each bell of the continuously rotatable turret has a vacuumizing and gassing duct communication with a rotary valve member which is rotatable about a stationary valve member having spaced vacuumizing and gassing ports therein with which the bell ducts serially register, and in which each said duct has a valve therein and there is included means for closing the valve in any bell to which a container is not being fed before the particular bell can reach said ports, and means for again opening said valve after the particular bell has passed said ports.

Another object of the invention is to provide machine structure of the character stated in which the valve closing means includes a roller engageable with an actuating arm projecting from the valve, said roller normally being retracted from the path of movement of said arm, electrically actuated means controlled by movement of containers toward the bells for momentarily placing the roller in effective position for closing the valve of any particular bell to which no container is being fed, and a stationary valve resetting roller engageable by resetting arms projecting from the valves for reopening closed valves.

With the above and other objects in view that will hereinafter appear, the nature of the invention will be more clearly understood by reference to the following detailed description, the appended claims, and the several views illustrated in the accompanying drawings.

In the drawings:

Figure 6 is a fragmentary sectional view taken on the line 6—6 on Figure 5.

Figure 7 is a detail horizontal section of the stationary valve body.

Figure 8 is a somewhat diagrammatic outer surface development of the stationary valve body shown in Figure 6.

Figure 9 is an enlarged fragmentary plan view illustrating the means for feeding cans and covers in loosely assembled relation onto the supporting pads of the vacuumizing and gassing machine turret structure.

Figure 10 is a part vertical cross section and part elevation the section being taken through the centers of the turret that feeds loosely assembled cans and covers into the vacuumizing and gassing machine and the turret that transfers friction assembled cans and covers from said machine into the closing machine.

Figure 11 is a fragmentary vertical cross sectional view illustrating the oscillatable cover transfer arm.

Figure 12 is a fragmentary face view illustrating the pad lifting and lowering cam track portions, the pad lock actuating track portions also being shown.

Figure 13 is a fragmentary sectional view showing one of the pad locking devices in the pad locking position in full lines, and in the pad releasing position in dotted lines.

Figure 14 is an enlarged sectional view illustrating a fragment of can with a cover applied in tight friction temporary closure thereof after being vacuumized and gassed.

*General arrangement*

Figure 1:
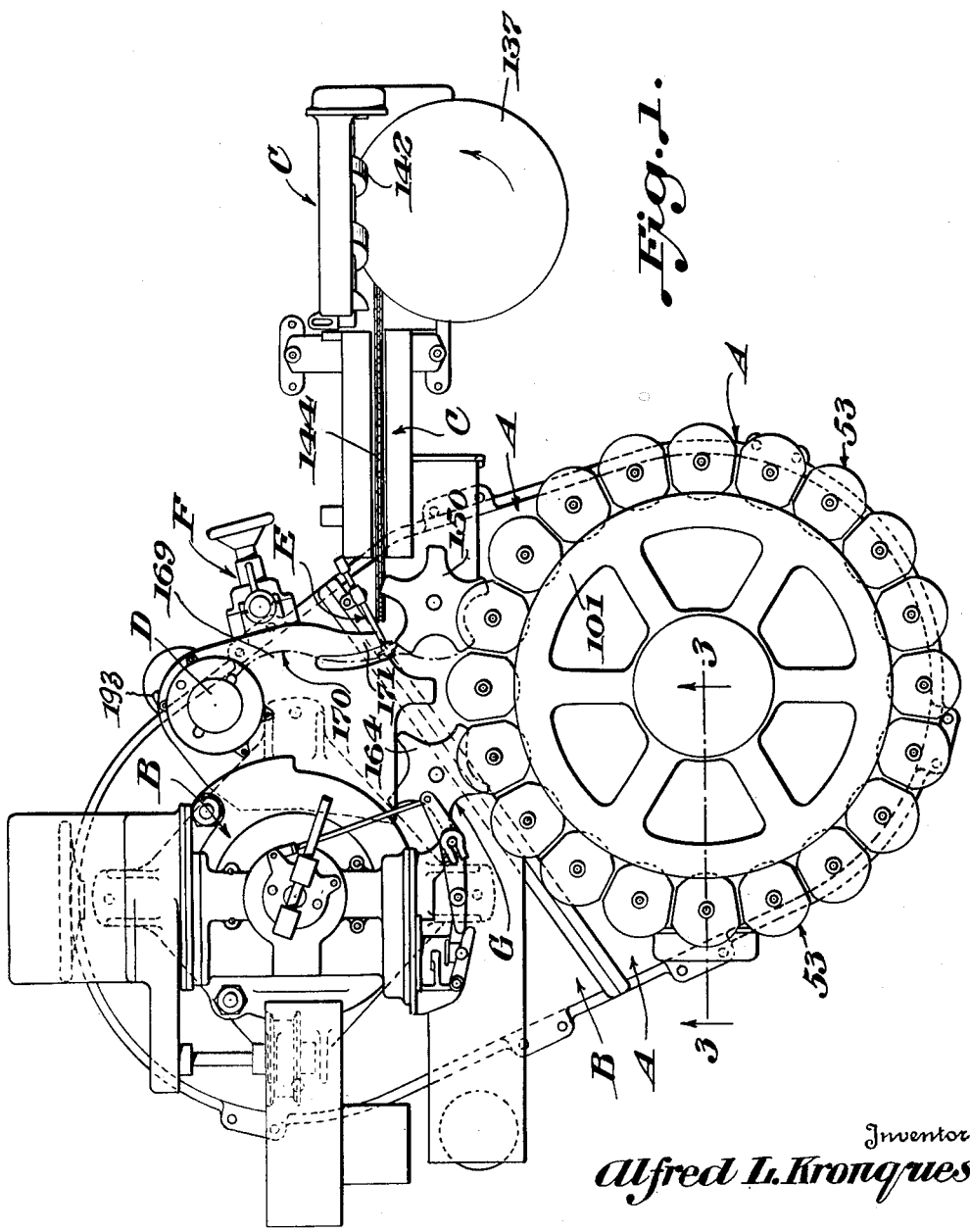
Figure 1 is a somewhat diagrammatic plan view illustrating the invention.
Figure 2:
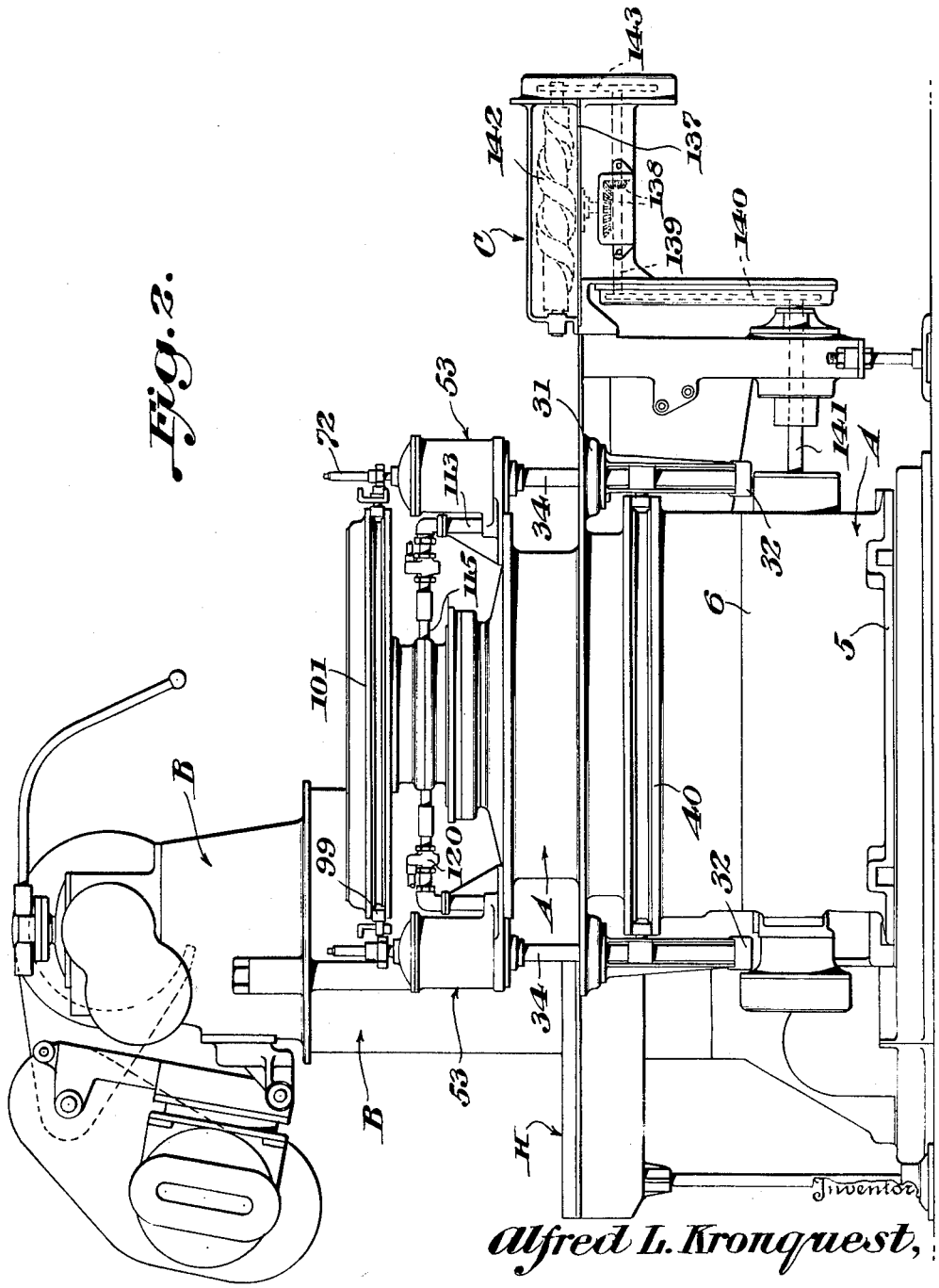
Figure 2 is a somewhat diagrammatic side elevation of the machine structure shown in Figure 1, all but two of the vacuumizing and gassing bells and the cooperating pad actuating devices being removed for purposes of clarity.

In the example of embodiment of the invention herein disclosed, the invention is illustrated as incorporated in a combination container vacuumizing, gassing and closing structure comprising a novel vacuumizing and gassing machine generaly designateld A and connected in cooperative relation with a standard closing machine generally designated B. This novel composite machine structure is best illustrated in Figures 1 and 2 of the drawings. The standard container feeding means of the closing machine, generally designated C, is employed to feed the containers into the vacuumizing and gassing machine A, and the cover feed means D of the standard closing machine is employed in the feeding of covers onto the containers, cooperating means generally designated E being employed for transferring said covers onto the containers as they are being fed into the vacuumizing and gassing machine. The marking means generally designated F and forming a part of the closing machine may be employed to mark the covers as they are fed away from the feed means D according to conventional practice.

After the containers have been vacuumized, gassed and temporarily closed by tight friction insertion of the covers therein, they are transferred by means generally designated G to the standard turret structure forming a part of the equipment for introducing the containers into the standard closing machine. After the containers have been finally sealed in the closing machine by the usual double roll seaming operation, they are discharged from the closing machine by feed-away means, generally designated H.

It is to be understood that the vacuumizing and gassing machine structure referred to is novel and is disclosed herein in detail, whereas the closing machine structure referred to may be of any approved form wherein the final sealing or closing of the containers is effected by the well known double roll seaming operation. An example of an acceptable form of closing machine usually embodying container feeding means, cover feeding and marking devices and closed container feed-away mechanism with which the novel vacuumizing and gassing machine structure can readily be connected in cooperative relation in the manner hereinabove described is disclosed in U. S. Letters Patent 1,752,912, issued to Alfred L. Kronquest on April 1, 1930.

Vacuumizing and gassing machine

In describing in detail the structure of the improved vacuumizing and gassing machine A, attention is directed to Figures 1 to 8 of the drawings. This machine structure includes a base frame 5 having a center column 6 equipped with an annular shelf 7 surrounded by an upstanding wall 8. Within the wall 8 and on the shelf 7 the base flange 9 of an upwardly extended column 10 is secured as at 11. The column 10 supports a turret structure generally designated 12 which rests upon anti-friction bearings 13 on the shelf and has bearings 14 rotatably surrounding said column.

Turret structure and drive

Figure 3:
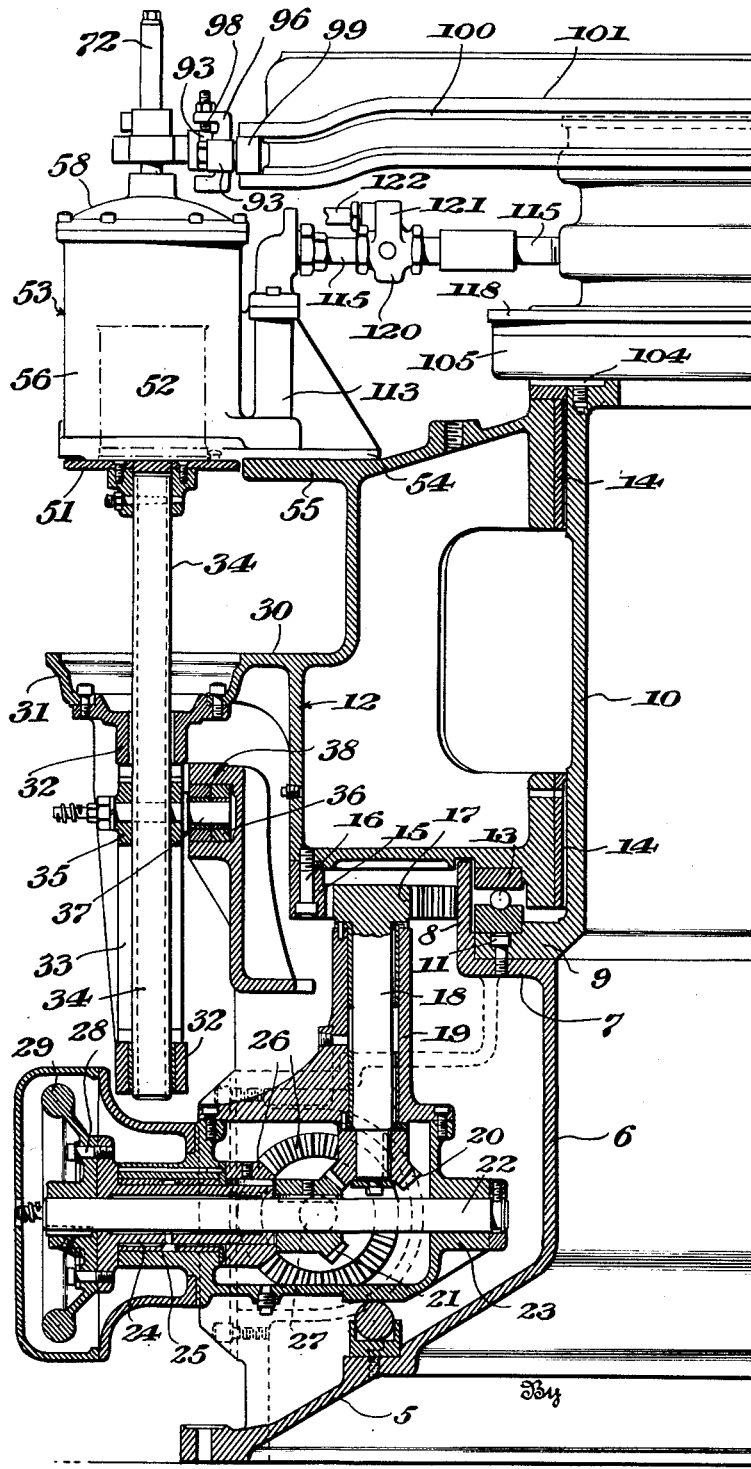
Figure 3 is an enlarged fragmentary vertical cross section taken on the line 3—3 on Figure 1, the bell and the rotary valve being shown in elevation.

It will be apparent by reference to Figure 3 that the turret structure has a ring gear 15 secured thereto as at 16, and rotation is imparted to the turret structure by a driver pinion 17 which meshes with the ring gear 15. The pinion 17 is carried at the upper end of a shaft 18 which is uprightly disposed in the base bearing 19, and the shaft has a bevel pinion 20 fixed to its lower end to which rotation is imparted by a bevel pinion 21 secured on a driver shaft 22 which is horizontally rotatable in a bearing 23 and in the sleeve 24 which is rotatable in the bearing 25. The sleeve 24 is driven by a bevel gear couple 26 from the driver shaft 27 which is in turn driven in any approved manner from a part of the closing machine B, thereby to assure that the parts of the vacuumizing and gassing machine A will be driven in properly timed relation to the moving parts of the closing machine. The sleeve 24 drives the shaft 22 through the relatively adjustable disk or flange connection 28 with the hand wheel 29 which is keyed on said shaft.

The turret structure 12 includes a table portion 30 which is equipped with a plurality of wells 31, one such well being provided for each of the vacuumizing and gassing bells to be described in detail hereinafter. While any desired number of such bells may be employed, twenty such units are embodied in the herein disclosed machine as will be apparent by reference to Figure 1 of the drawings.

Below each well 31 is provided a pair of vertically aligned bearings 32 and said bearings are connected by vertical guides 33. A pad supporting plunger member 34 is vertically slidable in each set of bearings 32, and a cross head 35 secured to each plunger member is equipped with a roller 36 mounted on a cross pin 37 and engageable in a cam groove generally designated 38 and which is formed or secured upon the base frame in the manner clearly illustrated in Figures 3 and 12 of the drawings.

Pad lifting and lowering means

The cam groove generally designated 38 serves to lift and lower the plunger members 34 between a lower position in which the containers are received on pads supported by said plungers and an upper position in which said pads place the containers in the bells in which they are vacuumized and gassed and seal said bells in a manner to be described hereinafter. It will be apparent by reference to Figure 12 of the drawings that the cam groove 38 includes a lifting portion 39, an upper dwell portion 40, a lowering portion 41 and a lower dwell portion 42. The main body of the upper dwell portion is slightly below the high points 43 at the respective ends of said upper dwell portion, and means is provided for locking the plungers at their elevated positions as the rollers are about to leave the advance high point 43 and for releasing the plunger holding locking devices after the rollers engage the other high point 43, thereby to secure the plungers in the elevated, bell sealing positions without imposing the full weight of the plungers and pads upon the floor of the groove in the upper dwell portion 40 during the vacuumizing and gassing operations.

Pad locking means

The plunger locking devices are best illustrated in Figures 3 and 13, and it will be apparent by reference to said figures that a bracket 44 is secured to each upper bearing 32, and on each said bracket a locking hook member 45 is pivotally mounted as at 46 and is equipped with a roller 47 which projects therefrom in position for engaging in a cam groove 48 mounted above the previously mentioned cam groove 38 in the manner illustrated in Figure 12. The cam groove 48 includes a hook depressing or locking portion 49 and a hook lifting or releasing portion 50. As each plunger 34 is lifted to the upper limit of its travel the respective hook member roller 47 will engage the hook depressing cam portion 49, and the hook of the member 45 will be forced under the respective cross pin 37 to secure the plunger in the elevated position. After the vacuumizing and gassing functions have been completed, said roller 47 will engage the hook lifting or releasing portion 50 of the cam groove 48 so as to remove the hook from beneath the pin 37 and permit the plunger member 34 to be lowered by the lowering portion 41 of the cam groove generally designated 38.

Vacuumizing and gassing bell structure

At its upper end, each plunger member 34 carries a container supporting pad 51 having a container centering member 52 projecting upwardly therefrom, and over each said pad a bell unit generally designated 53 is secured as at 54 on the upper table portion or flange of the turret structure 12. See Figures 1 to 4. Each of the bell units includes a cylindrical casing 56 which is open at the bottom and equipped with a sealing gasket 57 engageable by the respective pad 51, and the top portion of each bell is closed by a removably mounted cover 58.

Figure 4:
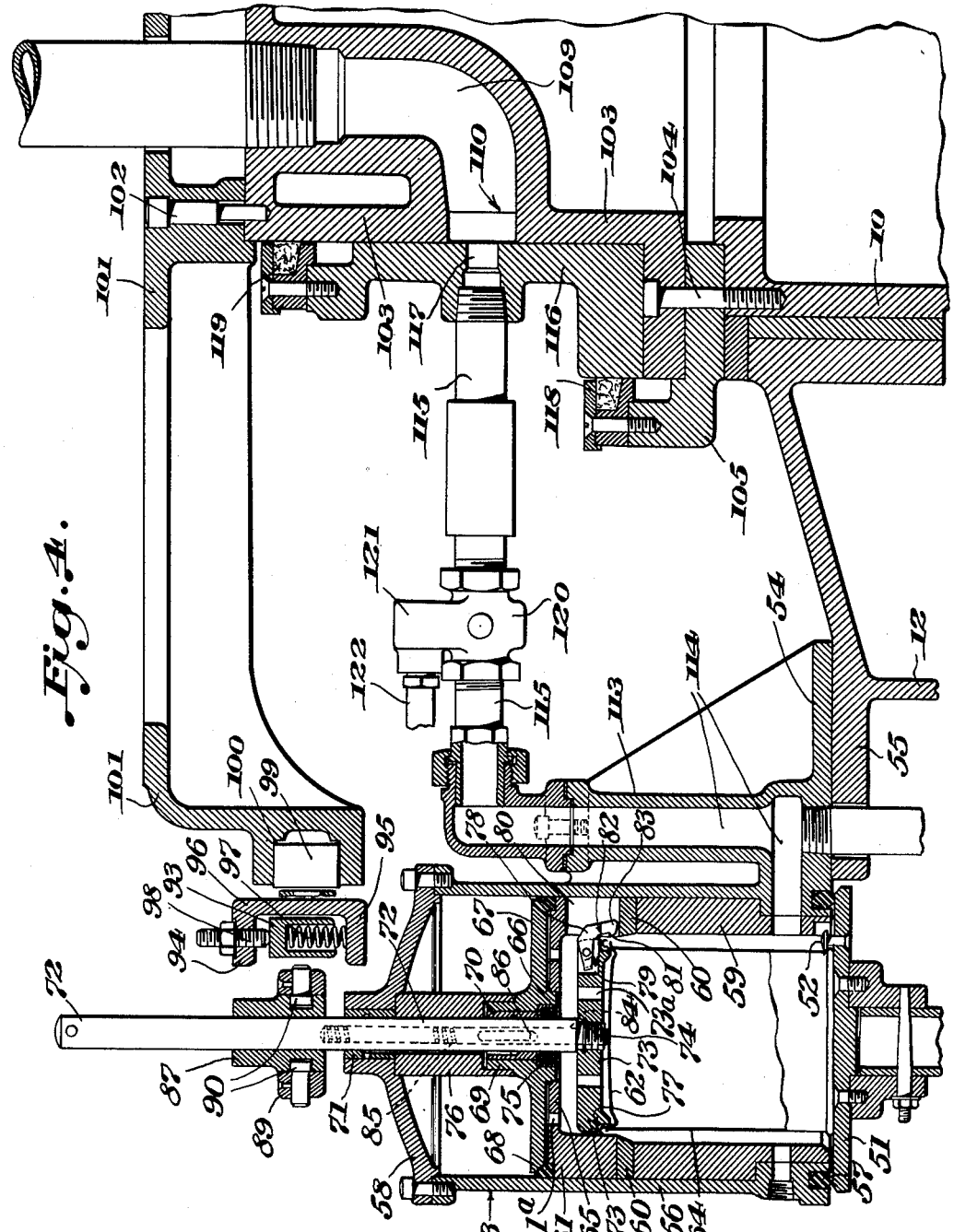
Figure 4 is an enlarged fragmentary section taken through one bell and the adjacent connected portion of the rotary valve.

The detailed structure of the bells is best shown in Figure 4 from which it will be apparent that each bell is equipped internally with a filler ring 59 of selective length and internal diameter surmounted by a hardened ring 60 which is in turn surmounted by a ring 61. The ring 61 is only slightly larger in internal diameter than the downwardly and inwardly turned curl on the domed cover or closure 62 when the container and its closure is mounted within the treating chamber in the bell as shown in Figure 4. Each closure or cover 62 includes a heel portion 63 which is receivable in the open upper end of a container 64, said heel being offset to provide two distinct diameters, the smaller of which is loosely receivable in the container in the manner illustrated in Figure 4, and the larger of which is receivable in said container in tight friction fit brought about by downward pressure applied on the closure. In other words, in the initial loose assembly of the container and closure complement shown in Figure 4, the larger diameter of the closure heel will project above the flanged top of the can with the offset portion of said heel resting on said flanged container top. It will also be apparent that the curl at the periphery of a cover projects slightly above and outwardly of the outwardly turned container flange.

The ring 61 within each bell is provided with an inwardly turned flange 65 having a center opening in which to receive a centering boss 66 depending from a ceiling plate 67 overlying said flange. The flange 65 and the ceiling plate 67 determine the upper limit of the treating chamber within the bell and divide the bell into a lower and an upper portion, said lower and upper portions being isolated by a sealing gasket 68 clamped between the plate 67 and the ring 61 in position for engaging the internal wall of the bell cylinder 56.

The hub 69 of the ceiling plate 67 and the bell cover 58 form bearings at 70 and 71 respectively for a chuck rod 72 which is vertically reciprocable in said bearings. A chuck 73 is secured as at 74 to the lower end of said rod. The rod 72 operates through a packed gland 75 in the ceiling plate hub 69, and a spacer sleeve 76 of selective length holds the ceiling plate 67 in definitely spaced relation between the bottom and top of the bell structure.

Treating chamber adjustment

By selecting the lengths of the sleeve 76 and the rings 59 and 61, the spacing of the ceiling plate 67 can be determined according to the height of containers to be treated in the bell chamber, and by selecting the internal diameter of said rings 59 and 61, the diameters of the treating chambers can be regulated in accordance with the diameters of the containers to be treated in the bell chambers, thereby to provide a limited amount of space surrounding the containers within the bell structures.

Chuck structure and operation

Each of the chucks 73 is shaped at its lower peripheral edge portion to fit within a cover heel and over the cover flange in the manner clearly illustrated in Figure 4, thereby to snugly fit within the closure heel and rest upon the closure. It will also be apparent that each chuck is equipped with three or more equidistantly spaced spring retracted fingers 78 mounted in recesses 79 in the top peripheral edge portion of the chuck, said fingers being disposed to operate in openings 80 which are provided in the ring 61 and open downwardly onto the top surface of the hardened ring 60. Each of the fingers 78 is shaped to include a hook portion 81 at its lower end disposed to be engageable under the peripheral curl of a cover, and said fingers also include upright wall portions 82 disposed to engage uprightly against the exteriors of said cover curls. The fingers 78 also include cam nose portions 83 which are engageable with the top surface of the hardened ring 60. It will be noted by reference to Figure 4 that the ring member 61 has apertures therethrough as at 61a, and the chuck 73 is similarly apertured as at 73a.

In the operation of the machine, after a container 64 with its closure 62 loosely assembled thereon in the manner illustrated in Figure 4 is lifted into and sealed in the bell 53 in the manner shown in said figure, the chuck 73 will be lifted from the position illustrated so as to free the cam nose portions 83 thereof from the hardened ring 60. Upward movement of the chuck will permit the fingers 78 to swing inwardly with the upright wall portions 82 thereof in engagement with the periphery of the cover and with the hook portions 81 thereof engaging under the cover curl and lifting the cover out of the open top of the container 64. With the cover 62 lifted out of the container in the manner stated, the vacuumizing and gassing of the container is effected. Each rod 72 is provided with a center plunger 84 which is vertically movable in a center bore provided in the rod, and each said plunger is forced downwardly by a spring 85 so that the lower end thereof will be able to contact a closure 62 in the manner illustrated in Figure 4. Should no container and cover assembly be present in the treating chamber of the bell, downward movement of the plunger 84 will be limited by the slot and pin equipment 86. The spring pressed plunger 84 is effective during the elevation of the chuck 73 in holding the lifted cover 72 firmly against the hook portions 81 of the lifting fingers 78.

Figure 5:
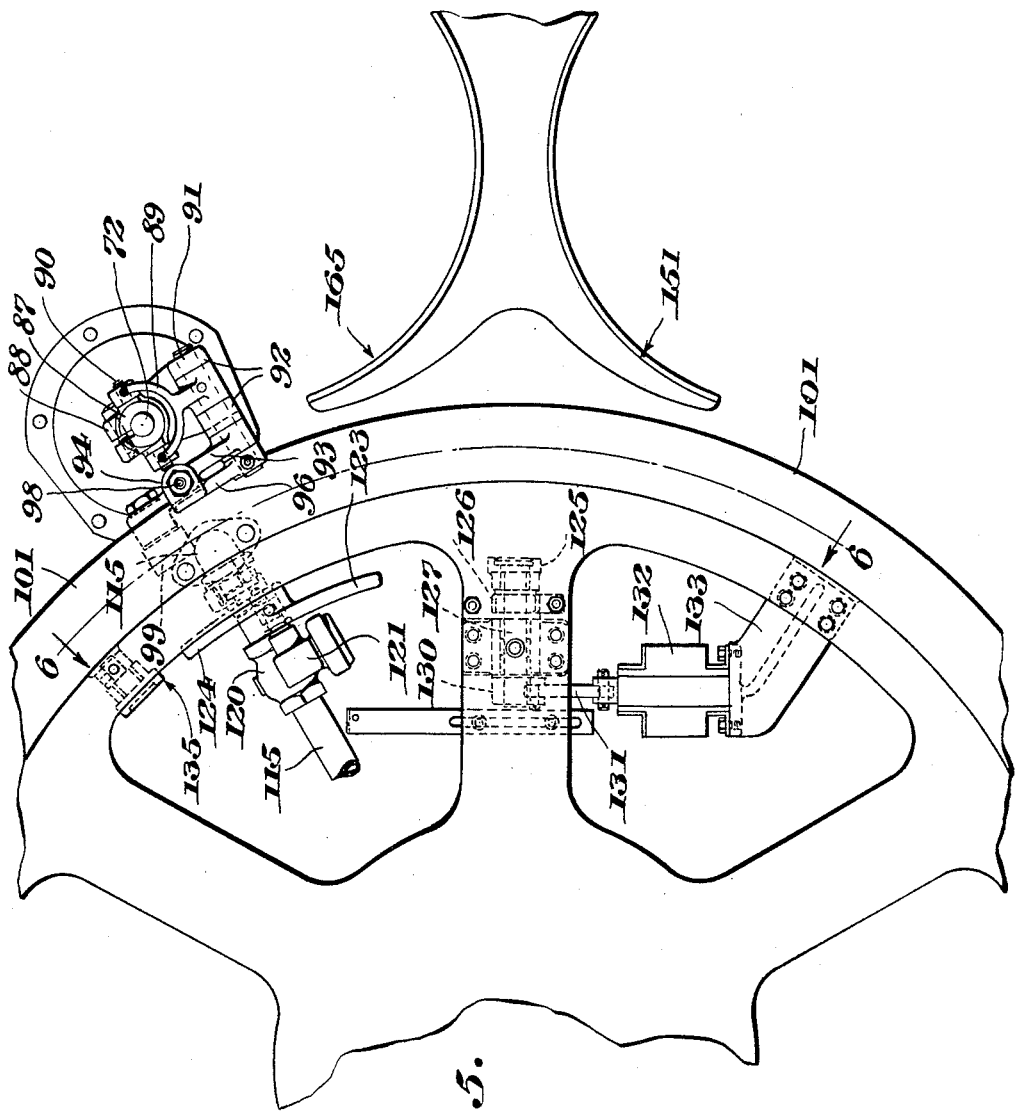
Figure 5 is a fragmentary plan view showing one bell unit and cooperating chuck and valve actuating devices.

After the vacuumizing and gassing of the container has been completed, the chuck 73 is lowered, and when the lower end extremities or cam nose portions 83 of the fingers 78 engage the top surface of the hardened ring 60, the fingers will be swung outwardly to release their grip on the closure 62 in the manner illustrated in Figure 4. Continued downward movement of the chuck will force the second or larger diameter of the heel 63 of the closure firmly into the container 64 and effect a temporary, tight friction assembly of the cover and container, after which the pad 51 lowers the temporarily closed can into position for being transferred to the closing machine to be finally closed or sealed therein by the usual double roll seaming operation. The means for vertically reciprocating the chucks will now be described. This means is best illustrated in Figures 4 and 5 of the drawings. A head 87 is vertically-adjustably secured as at 88 on each rod 72, and a crank member 89 is pivoted as at 90 to the head and is secured to a cross pin 91 which is pivoted in ears 92 projecting upwardly from the respective bell cover 58. A crank arm 93 is loosely mounted on the pin 91 and has its free end projected between upper and lower ears 94 and 95 formed on a crank arm 96 which is secured on the pin 91. The free end of the crank arm 93 has yieldable abutment at 97 with the lower arm ear 95 and fixed, adjustable abutment at 98 with the upper arm ear 94. The end extremity of the loosely mounted arm 93 is equipped with a roller 99 which engages in a groove 100 in a cam 101 fixed as at 102 upon the stationary valve body 103 which is in turn fixed as at 104 with the ring 105 on the upper end extremity of the center column 10. It is to be understood that the cam groove 100 is suitably shaped to provide the desired upward and downward movements of the chuck rod 72, and it will be apparent that by reason of the provision of the yieldable abutments 97, the downward pressure applied to the rods is a yielding pressure which will avoid jamming of parts.

Vacuum and gas control

It will be apparent by reference to Figures 7 and 8 of the drawings that the stationary valve body 103 is equipped with a low vacuum duct 106 opening at the periphery in a longitudinal extension 107, and leading up to said extension is a surface clearance 108 which extends a considerable distance about the valve body in advance of the extension 107 and is of gradually increasing width and depth as it approaches said extension. The valve body 103 also is equipped with a high vacuum duct 109 which opens at its periphery into a longitudinal extension 110, and said valve body also includes an inert gas duct 111 which opens at its periphery into a longitudinal extension 112. Each of the ducts 106, 109 and 111 has an individual source connection. It has been found that by drawing the vacuum in two stages by first causing the individual bell porting to communicate with the low vacuum duct 106 and its extensions 107, 108, and then with the high vacuum duct 109 and its extension 110, an exceptionally high vacuum can be drawn in the containers in a gradual manner which will avoid the drawing of bits of coffee or comparable powdery material into the space between the container and cover flanges and the subsequent formation of faulty seams by reason of the rolling of the seam structures with bits of coffee or other fill material included therein. It is to be understood that the inert gas may be directed into the bell chambers and the containers therein at two pounds pressure absolute.

In order to provide for proper communication between the interiors of the bells and the vacuum and gas ducts, each bell is provided with an extension 113 in which a vacuumizing and gassing duct 114 is provided in the manner clearly illustrated in Figure 4. Each duct 114 is connected by a rigid duct or connecting line 115 with a rotary valve ring 116 surrounding the stationary valve body 103 and having a port 117 at the end of each duct or connecting line 115 for serial registration with the duct extensions 108, 107, 110 and 112 of the stationary valve body 103. It is to be understood that the valve ring 116 rotates with the turret structure 12 and is engaged by a packing ring 118 which is secured to the previously mentioned ring 105, and the valve ring 116 in turn carries a packing ring 119 which engages the periphery of the stationary valve body 103.

*No container—No vacuumizing and gassing control valves*

Means is provided for closing any vacuumizing and gassing duct 115 connected with a bell structure 53 in which no container will be present so that there will be no vacuumizing and gassing operation when no container is present in a given bell. This mechanism is best shown in Figures 5, 6 and 9 of the drawings. Each duct 115 is equipped with a cut-off valve 120, and each valve has an extension 121 in which a cut-off actuator shaft 122 is rockable. Each shaft 122 has an actuator member secured thereon and each actuator member includes a valve closing finger 123 projecting in one direction therefrom and a valve opening finger 124 projecting in the opposite directions therefrom. Each valve closing finger 123 is disposed to be engageable with a roller 125 mounted on an arm 126 which is rockably supported at 127 on the cam 101. The arm 126 has a stop projection 128 which is engageable with an adjustable stop 129, and an arm extension 130 which is link connected as at 131 with a core of a solenoid 132. The solenoid is secured to a bracket 133 which is supported by the cam 101, and an anchored spring constantly tends to hold the roller in the retracted, ineffective position illustrated in dotted lines in Figure 6. Means to be described hereinafter is provided for energizing the solenoid 132 whenever a container is not to be fed into a given bell structure, and when the solenoid is energized the roller 125 is projected to the effective position illustrated in full lines in Figure 6 and will engage the oncoming valve closing finger 123 associated with the particular bell structure so as to move said finger from the full line position illustrated in Figure 6 to the dotted line position for closing the respective valve 120 and preventing vacuumizing and gassing of the particular bell. Each time the roller 125 has been moved to its effective position in the manner stated, it will spring back to its ineffective, dotted line position as soon as the particular valve closing finger 123 moves out of contact therewith, thereby to avoid the closing of subsequently passing valves associated with bell structures to which containers are properly being fed.

Whenever a valve has been closed in the manner above described, it will be reset to the normal open position before the turret structure again brings the same around to the position of the closing roller 125 by a fixedly, though adjustably, supported roller 135 supported as at 136 by the cam 101 in position for engaging the valve opening finger 124. The roller 135 and the mounting thereof is clearly illustrated in Figure 6.

*Container and cover infeeding*

The means for feeding containers and covers into the vacuumizing and gassing machine is best illustrated in Figures 1, 9, 10 and 11 of the drawings. The container feeding means includes a rotary disk 137 onto which the containers can be placed by hand or by any approved feeding mechanism, and said disk may be driven by a bevel gear couple 138 from a shaft 139 which may be driven in any approved manner, as by sprocket and chain connections 140, from the shaft extension 141. The disk 137 presents the containers to the timing screw 142 which may be driven in any approved manner, as by sprocket and chain connections 143 with the shaft 139. The screw 142 properly times the containers onto the feed lug equipped chain 144 which passes over idler sprockets 145, the tightener sprocket 146 and the driver sprocket 147 and feeds the containers over the feedway 148 in properly timed relation to be received in the pockets 149 of the turret 150. The turret 150 feeds the containers onto the pads 51 of the vacuumizing and gassing machine turret structure with the aid of the arcuate guide 151.

The turret 150 is secured to the upper end of a shaft 152 which is rotatable in bearings 153 and imparts rotation to the driver sprocket 147 through the bevel gear couple 154.

The shaft 152 is driven through a bevel gear couple 155 by a sleeve 156 which is in turn driven through the overload release clutch 157 from the shaft 158. See Figure 10. A gear 159 on the sleeve 156 meshes with and drives a similar gear on the previously mentioned shaft extension 141 for imparting rotation to said shaft extension. The shaft 158 is driven through a bevel gear couple 160 by the previously mentioned shaft 27 and serves to drive the upright shaft 161 rotatable in the bearings 162 through the bevel gear couple 163.

The shaft 161 has a transfer turret 164 secured to the upper end thereof and said transfer turret removes the friction closed containers from the pads 51 of the vacuumizing and gassing machine with the aid of the arcuate guide 165 and delivers them into the pockets 166 of the turret 167. The turret 167 forms a part of the standard closing machine and delivers the temporarily closed containers to the closing turret of said closing machine whereon the final double seam sealing of the containers is effected. The closing turret is diagrammatically indicated at 168 in Figure 9.

The closures or covers 62 are dropped one by one from the cover feed means generally designated D and are moved over the arcuate guideway 169 along the line indicated at 170 toward the recurved extension 171 of said guideway from which they fall onto the containers 64 in the pockets 149 of the previously mentioned turret 150. The turret 150 feeds the loosely assembled cover and container complements onto the pads 51 of the vacuumizing and closing machine in the manner previously described. The initial movement of the covers 62 along the feed line indicated at 170 is effected by the cover feed star wheel 172 which moves with the previously mentioned turret 167, and as each cover approaches the guide extension thereof, the feed thereof is taken over by an oscillating feeder finger 173 which is mounted and operates in the manner best illustrated in Figures 9 and 11 of the drawings. The finger 173 is supported as at 174 at the free end of an arm 175 which is pivoted at 176 to swing in a vertical plane on a supporting member 177. The member 177 is in turn pivoted to rock about a vertical axis at 178 on a bracket 179 secured upon a support 180 which is vertically-adjustably mounted as at 181 on the machine framing.

The support 180 also provides bearing at 182 for an uprightly disposed shaft 183 having spline connection at 184 at its lower end in a sleeve bevel pinion 185 which is rotatable in the frame bearing 186 and driven by a bevel gear 187 secured to the previously mentioned chain driving sprocket 147. A crank arm 188 is secured to the upper end of a shaft 183, and at its free end said crank arm carries an upstanding pin 189 to which a slide member 190 slidably embracing the arm 175 is rockably connected as at 191.

It will be apparent by reference to Figure 11 that as the shaft 183 is rotated, the slide member 190 will be rotated about the axis of said shaft, and because of the relative placement of the rod pivot 176 will serve to swing the arm 175 about the axis of the pivot pin 178, swinging the feed finger 173 back and forth in an arcuate path. During the swinging movement of the feed finger 173 the arm 174 is also moved upwardly and downwardly. This upward and downward movement is so controlled by relative placement of the shaft 183 and the pivot pin 178 that the finger 173, in moving in the feeding direction, moves at such elevation as to properly engage behind and feed the covers so that they will properly fall off the end of the extension 171 onto containers 64 moving in the turret pockets 149, and said fingers will be lifted out of contact with said cover so as not to interfere therewith as the finger is moved back on its return stroke preparatory to the next succeeding feeding engagement with a cover.

No container—no cover feed control

It will be apparent by reference to Figure 9 of the drawings that the feedway 148 over which the containers are fed by the chain 144 is flanked by a cam 192 which constantly tends to move into the path of travel of the containers and is displaced laterally by movement of containers therepast. The cam 192 is connected by control devices generally designated 193 with a cover feed mechanism generally designated D. This mechanism constitutes a no container, no cover feed control. It is to be understood that any acceptable form of no container, no cover feed control may be employed, and since this particular mechanism in itself, forms no part of the present invention further detailed description of the construction and operation of said mechanism is deemed unnecessary.

No container—no vacuumizing and gassing valve controlling devices

The invention also comprehends the provision of a novel no container, no vacuumizing and gassing control, and this means includes a container guiding sector 194 pivoted as at 195 to two bell crank levers 196 which are pivotally supported as at 197 and connected by a tie-rod 198. An anchored spring 199 constantly tends to force the sector inwardly into the path of travel of containers being moved toward the vacuumizing and gassing machine turret structure pads 51 by the turret 150, and so long as containers are properly being fed by said turret, the sector 195 will be held at its outwardly displaced position. When one or more turret pockets 149 come opposite said sector without containers therein, said sector will be moved inwardly by the anchored spring 199.

The sector has an actuator projection 200 extending outwardly therefrom in position for normally engaging with and depressing the button of a normally open switch 201 which is connected in a control circuit including a power source and the previously mentioned solenoid 132. Thus, whenever the sector 194 moves inwardly, as when a turret pocket 149 is passing the same without a container therein, the switch 201 will close and energize the solenoid 132 so as to effect a placement of the valve closing roller 125 in the position illustrated in full lines in Figure 6 and a closing of the particular cut-off valve 120 associated with any bell which will be devoid of a container. It is to be understood, of course, that the control parts are so cooperatively arranged that the valve 120 associated with the bell into which the empty turret pocket 149 was to have fed a container is closed, the actuator roller 125 being placed in effective position for the valve closing purpose only momentarily and then being returned to its ineffective position in the manner previously described.

Operation

In operation, the containers 64 are fed onto the disk 137 and are presented by the disk to the screw 42 which times them onto the chain 144. The chain moves the containers past the no container, no cover feed control cam 192 and into the pockets of the turret 150 which diverts them onto the pads 51 of the vacuumizing and gassing machine turret structure. If no container is moved past the cam 192 no cover will be dropped by the cover feed mechanism D. If containers are being fed normally to the turret 150 the cover feed start wheel 172 and the oscillating finger 173 will feed covers onto the containers as they are being moved into the vacuumizing and gassing machine by the turret 150.

After each container is fed onto a turret structure pad 51 in the vacuumizing and gassing machine, the pad is lifted into the position illustrated in Figure 4 to seal the particular container treating bell 53 with the container and cover therein in the loosely assembled position illustrated in said Figure 4. The pad is locked in tight engagement with the gasket 57 by the respective locking hook 45 so that the unit will be moved through the treating stages with the pad supporting roller 36 supported out of contact with the cam groove 38.

After the container and cover complement has been properly sealed in the bell 53 in the manner illustrated in Figure 4, the chuck 73 will be lifted to free the fingers 78 from the hardened ring 60 and permit them to move inwardly into engagement with and lift the cover 62 from the open top of the container 64, the spring plunger 84 serving to yieldably press the cover downwardly against the finger hook portions 81. With the cover thus held above the open top of the container the unit port 117 comes opposite the vacuumizing valve clearance 108, and as said port moves over the gradually widening and deepening clearance 108 and into communication with the port extension 107 a low vacuum will gradually be drawn in the container in a manner assuring against the drawing up of bits of coffee or comparable material into position for being retained between the cover and can flanges when it is later attempted to effect a double seam sealing of the container. The unit port 117 next passes into communication with the high vacuum duct extension and completion of the drawing of a high vacuum in the container is effected without disturbing the contents in the container. By drawing the vacuum in the manner stated, gradually and in two stages, it is possible to draw a vacuum in excess of 29 inches without objectionably disturbing the contents of the containers and without danger of drawing bits of the fill into position for interfering with subsequent efficient sealing of the container.

The unit port 117 next passes into communication with the gas duct extension 112 and the gassing of the container is effected while the cover is still held off the open top of the container 64. As previously stated the inert gas is directed into the bell and the container therein at two pounds' pressure.

After the vacuumizing and gassing of the container in the manner above described, the chuck 73 is forced downwardly causing the cam nose portions 83 of the fingers 78 to engage the hardened ring 60 and be spread in the manner illustrated in Figure 4 for releasing the cover. Continued downward movement of the chuck forces the larger diameter of the cover heel portion 63 into temporary, tight friction assembly in the container 64. Thereafter, the respective lock roller 47 engages the unlocking cam portion 50 to displace the locking member 45 from beneath the respective cross pin 37, and then the pad supporting the friction closed container is lowered by the movement of the respective supporting roller 36 down the lowering cam portion 41. After the pad 51 has been fully lowered, the temporarily closed container is transferred by the turret 164, guide 165 and turret 167 from the vacuumizing and gassing machine to the closing turret 168 of the closing machine in the manner previously described.

At any time a pocket of the turret 150 moves toward a pad 51 of the vacuumizing and gassing machine without a container therein, the no container, no vacuumizing or gassing mechanism including the control sector 194 will function to close the valve 120 associated with the unit of which said pad forms a part and prevent the vacuumizing and gassing of said unit in the manner previously described.

While one form of the invention has been shown for purposes of illustration, it is to be understood that various changes in the details of construction and arrangement of parts may be made without departing from the spirit and scope of the invention as defined in the appended claims.

I claim:

1. A container vacuumizing gassing and closing unit comprising, in combination, a vacuumizing and gassing machine, a closing machine, means for feeding filled containers and closures into the vacuumizing and gassing machine, means for vacuumizing the containers in the vacuumizing and gassing machine, said closures having provision for engaging in and effecting a temporary friction closure of the containers, means in the vacuumizing and gassing machine for bringing about temporary friction closure of the containers after they are vacuumized and gassed, each said machine including a continuously rotating container supporting turret, said turrets being arranged in juxtaposition, and rotary transfer means for transferring over a short path the temporarily closed containers from the vacuumizing and gassing machine turret to the closing machine turret to be permanently sealed thereon.

2. The assembly in a unitary structure of a closing machine and its closure feed means and filled container feed means, and a vacuumizing machine including individual chambers in which to receive and closely confine containers as they are being vacuumized, means for directing filled containers from said filled container feed means into said vacuumizing machine chambers, means for delivering closures from said closure feed means onto the containers as they are moving into the vacuumizing machine, means for bringing about the vacuumizing of the containers in said vacuumizing machine chambers, means for frictionally inserting the closures in the vacuumized containers within said chambers, each said machine including a continuously rotating container supporting turret, said turrets being arranged in juxtaposition, and rotary transfer means for transferring over a short path the vacuumized containers from the vacuumizing machine turret to the closing machine turret to be sealed therein.

3. The assembly in a unitary structure of a closing machine and its closure feed means and filled container feed means, and a vacuumizing and gassing machine including individual chambers in which to receive and closely confine containers as they are being vacuumized, means for directing filled containers from said filled container feed means into said vacuumizing and gassing machine chambers, means for delivering closures from said closure feed means onto containers as they are moving into the vacuumizing and gassing machine, said closures having provision for engaging in and effecting a temporary friction closure of the containers, means in the vacuumizing and gassing machine for bringing about the vacuumizing and gassing of the containers, means in the vacuumizing and gassing machine for bringing about a temporary friction closure of the containers within said chambers after they are vacuumized and gassed, and each said machine including a continuously rotating container supporting turret, said turrets being arranged in juxtaposition, and rotary transfer means for transferring the temporarily closed containers from the vacuumizing and gassing machine turret to the closing machine turret to be permanently sealed therein.

4. In a container vacuumizing and gassing machine, a rotary turret, a plurality of bells and complementary container supporting pads on the turret, means for bringing the pads and bells together to enclose containers therein, means for gradually and continuously drawing a vacuum up to approximately 28" in the container enclosing bells in a first stage from an individual source, means for continuously drawing a higher vacuum in the partially vacuumized bells and the containers therein in a second stage from an individual source, means for directing an inert gas under pressure into the vacuumized bells and containers, and means for bringing about separation of said bells and pads.

5. In a container vacuumizing and gassing machine, a rotary turret, a plurality of bells and complementary container supporting pads on the turret, means for bringing the pads and bells together to enclose containers therein, a valve ring rotatable with the turret, each said bell having a vacuumizing and gassing duct connected with and opening inwardly through said ring, a stationary valve member having a low vacuum chamber connected with an individual low vacuum source, a high vacuum chamber connected with an individual high vacuum source, and a gas chamber connected with an individual source of gas under pressure, each said chamber opening through the periphery of the stationary valve member in a circumferential extension and said extensions being disposed to be serially passed over by the individual bell ducts, and the low vacuum chamber opening extension being dimensioned to pass about a considerable portion of the diameter of the stationary valve toward the direction from which the bell ducts approach and being of gradually increased depth and width in the direction of progression of said ducts so that the low vacuum will be gradually drawn in the serially presented bells followed by the drawing of the high vacuum and the gassing of said bells, and means for bringing about separation of said bells and pads.

6. Machine structure as defined in claim 5 in which each of the vacuumizing and gassing bell ducts has a cut off valve therein, and in which there is included means for closing the valve of any bell devoid of a container to prevent unnecessary vacuumizing and gassing thereof.

7. In a container vacuumizing and gassing machine, a rotary turret, a plurality of bells and complementary container supporting pads on the turret, means for bringing the pads and bells together to enclose containers therein, a valve ring rotatable with the turret, each said bell having a vacuumizing and gassing duct connected with an opening inwardly through said ring, a stationary valve member having a low vacuum chamber connected with an individual low vacuum source, a high vacuum chamber connected with an individual high vacuum source, and a gas chamber connected with an individual source of gas under pressure, each said chamber opening through the periphery of the stationary valve member in a circumferential extension and said extensions being disposed to be serially passed over by the individual bell ducts, means for feeding untreated containers onto the pads, means for removing treated containers from the pads, a cut off valve in each bell duct, means for closing the valve associated with any bell and pad complement to which a container is not fed prior to the communication of such duct with the several chamber opening extensions, means for again opening all closed valves after the ducts with which they are associated have passed said chamber opening extensions, and means for bringing about separation of the bells and pads.

8. In a container vacuumizing machine, a continuously rotating turret, a plurality of bells and complementary container supporting pads on the turret, means for feeding onto the pads filled containers having closures loosely resting thereon and including heel portions dimensioned to have tight friction fit in the containers, means for bringing the pads and bells together to enclose the containers therein, vertically reciprocable devices movable with the turret and having provision for engaging the closures at their peripheral edges and lifting the closures from the containers within the bells, means for vacuumizing the uncovered containers, means vertically reciprocal with the closure lifting devices and engageable with the closures for forcing the closures into tight friction temporary closing contact in the vacuumized containers, means for bringing about separation of the bells and pads, and means for removing the temporarily closed containers from the pads for subsequent permanent sealing.

9. Machine structure as defined in claim 8 in which the closure forcing means in each bell comprises a vertically reciprocal chuck having provision for exerting downward pressure on the closures adjacent the peripheries thereof, and in which the closure lifting means comprises a plurality of gripper fingers carried by the chuck and engageable with the peripheral edges of the closures for lifting and lowering the same.

10. In a container vacuumizing machine, a rotary turret, a plurality of bells and complementary container supporting pads on the turret, means for feeding onto the pads filled containers having closures loosely resting thereon and including heel portions dimensioned to have tight friction fit in the containers, means for bringing the pads and bells together to enclose the containers therein, means operable within each bell and carried on a rod vertically reciprocal through the top of the bell for lifting closures from the containers and then lowering them onto said containers, means for vacuumiing the uncovered containers, means for bringing about separation of the bells and pads, and means for removing the vacuumized containers from the pads, each said bell also having therein a ceiling plate means, a spacer sleeve surrounding the rod and which is of selective length for determining the height of the ceiling plate means below the top of the bell, and ring means below the ceiling plate means and selective as to length according to the desired spacing of the ceiling plate above the bottom of the bell and as to internal diameter for selectively varying the diameter of the treating chamber within the bell.

11. Machine structure as defined in claim 10 in which there is included in each bell means associated with the variably placed ceiling plate for sealing off the treating chamber below said plate from the bell space above said plate.

12. In a container vacuumizing apparatus, a bell, a pad for supporting a filled container having a closure loosely resting thereon and including a heel portion dimensioned to have tight friction fit in the container, said bell and pad being adapted to be brought together in a manner for enclosing the container and its closure within the bell, means for lifting the closure from the container enclosed within the bell, means for vacuumizing the uncovered container, and means including a vertically reciprocable member within the bell in position for being engageable with a closure loosely resting on a filled container therein, and means operable from without the bell and in timed relation with the pad lifting means and the vacuumizing means for forcing the closure into tight friction temporary closing contact in the vacuumized container for maintaining the container and closure assembly and the evacuated condition of the container until permanent sealing of the container is effected.

13. In a container vacuumizing apparatus, a bell, a pad for supporting a filled container having a closure loosely resting thereon and including a heel portion dimensioned to have tight friction fit in the container, said bell and pad being adapted to be brought together in a manner for enclosing the container and its closure within the bell, means operable within the bell and carried on a rod vertically reciprocable through the top of the bell for lifting a closure from the container and then lowering the same onto the container within the bell, means for vacuumizing the uncovered container, said bell having therein a ceiling plate means, a spacer sleeve surrounding the rod and which is of selective length for determining the height of the ceiling plate means below the top of the bell, and ring means below the ceiling plate means and selective as to length according to the desired spacing of the ceiling plate above the bottom of the bell and as to internal diameter for selectively varying the diameter of the treating chamber within the bell.

14. Apparatus as defined in claim 13 in which there is included in the bell means associated with the variably placed ceiling plate for sealing off the treating chamber below said plate from the bell space above said plate.

15. In a container vacuumizing and gassing machine, a rotary turret, a plurality of bells and complementary container supporting pads on the turret, a vertically reciprocable member supporting each pad and having a roller thereon, cam means engageable by the rollers and effective for lifting the pads against the bells for enclosing pad supported containers in the bells, deformable gasket means compressed by engagement of the pads with the bells and effective to seal the bells, means for locking the pads in the bell sealing position, means for vacuumizing the sealed bells and containers therein, means for directing an inert gas under pressure into the sealed bells and the containers therein, means for releasing the locking means, and cam means engaged by the rollers and effective for lowering the pads away from the bells, said locking means comprising a pin projecting from each vertically reciprocable member, a lock hook pivoted to the turret in position for engaging each said pin, cam means for engaging each hook under the respective pin as the associated pad is moved into full sealing contact with the respective bell for holding the associated gasket means compressed, and cam means for removing the hooks from under said pins to permit the respective pads to be lowered by the pad lowering cam means.

16. In a container vacuumizing machine, a rotary turret, a plurality of bells and complementary container supporting pads on the turret, means for feeding filled containers onto the pads, means for bringing the pads and bells together to enclose containers therein, a valve ring rotatable with the turret, each said bell having a vacuumizing duct connected with and opening inwardly through said ring, a stationary valve member having a vacuum chamber therein connected with a vacuum source and opening through a port in the periphery of the stationary valve disposed to be serially passed over by the individual bell ducts, a cut off valve in each bell duct, actuator arm means projecting from each duct valve, a guide sector yieldably held against containers moving into the machine, a circuit controlling switch controlled by said sector and effective to close the circuit each time the feeding means is not feeding containers toward one or more bells, a valve closing device and means effective each time the circuit is closed for momentarily placing said device in position for closing the duct valve associated with a particular bell to which no container is being fed and permitting said device to return to a retracted position after each bell devoid of a container has passed the vacuumizing port, and means engageable by the valve arm means for reopening each closed valve after it passes said port.

17. In a container vacuumizing machine, a rotary turret, a plurality of bells and complementary container supporting pads on the turret, means for feeding onto the pads filled containers having closures loosely resting thereon and including heel portions dimensioned to have tight friction fit in the containers, means for bringing the pads and bells together to enclose the containers therein, means for lifting the closures from the containers within the bells, means for vacuumizing the uncovered containers, means for forcing the closures into tight friction temporary closing contact in the vacuumized containers, means for bringing about separation of the bells and pads, and means for removing the temporarily closed containers from the pads for subsequent permanent sealing, said closure forcing means comprising a vertically reciprocable chuck in each bell having provision for exerting downward pressure on the closures adjacent the peripheries thereof, said closure lifting means comprising a plurality of gripper fingers carried by each chuck and engageable with the peripheral edges of the closures for lifting and lowering the same, and there also being included in each bell a ring having its inner diameter beveled and dimensioned to form a centering guide for containers during the bringing together of the respective pad and bell, the top surface of said ring being engageable by the respective chuck fingers as the chuck moves downwardly for spreading the fingers apart and releasing a closure therefrom to fall upon the underlying container.

18. In a container vacuumizing apparatus, a bell, a pad for supporting a filled container having a closure loosely resting thereon and including a heel portion dimensioned to have tight friction fit in the container, said bell and pad being adapted to be brought together in a manner for enclosing the container and its closure within the bell, means for lifting the closure from the container enclosed within the bell, means for vacuumizing the uncovered container, and means for forcing the closure into tight friction temporary closing contact in the vacuumized container for maintaining the container and closure assembly and the evacuated condition of the container until permanent sealing of the container is effected, said closure forcing means comprising a vertically reciprocable chuck having provision for exerting downward pressure on the closures adjacent the peripheries thereof, said closure lifting means comprising a plurality of gripper fingers carried by the chuck and engageable with the peripheral edges of the closures for lifting and lowering the same, and there also being included in said bell a ring having its inner diameter beveled and dimensioned to form a centering guide for containers during the bringing together of the respective pad and the bell, the top surface of said ring being engageable by the chuck fingers as the chuck moves downwardly for spreading the fingers apart and releasing a closure therefrom to fall upon the underlying container.

19. In a container vacuumizing and gassing machine, a rotary turret, a plurality of bells and complementary container supporting pads on the turret, means for bringing the pads and bells together to enclose containers therein, a valve ring rotatable with the turret, each said bell having a vacuumizing and gassing duct connected with and opening inwardly through said ring, a stationary valve member having a low vacuum chamber connected with an individual low vacuum source, a high vacuum chamber connected with an individual high vacuum source, and a gas chamber connected with an individual source of gas under pressure, each said chamber opening through the periphery of the stationary valve member in a circumferential extension and said extensions being disposed to be serially passed over by the individual bell ducts, and the low vacuum chamber opening extension being dimensioned to pass about a considerable portion of the diameter of the stationary valve toward the direction from which the bell ducts approach and being of gradually increased depth and width in the direction of progression of said ducts so that the low vacuum will be gradually drawn in the serially presented bells followed by the drawing of the high vacuum and the gassing of said bells, and means for bringing about separation of said bells and pads, each said vacuumizing and gassing bell duct having a cut off valve therein, means for closing the valve of any bell devoid of a container to prevent unnecessary vacuumizing and gassing thereof, said valve closing means including a valve closing arm and a valve reopening arm projecting from each of the duct valves, a closing roller normally out of the path of travel of the actuater arm, means controlled by movement of containers toward the bells for momentarily placing the closing roller in effective position for closing the duct valve of any bell to which no container is being fed, and a stationary duct valve reopening roller engageable by the reopening arm of each closed duct valve for effecting a reopening of all closed duct valves.

20. In a container vacuumizing machine, a rotary turret, a plurality of bells and complementary container supporting pads on the turret, means for feeding onto the pads filled containers having closures loosely resting thereon and including heel portions dimensioned to have tight friction fit in the containers, means for bringing the pads and bells together to enclose the containers therein, means for lifting the closures from the containers within the bells, means for vacuumizing the uncovered containers, means for forcing the closures into tight friction temporary closing contact in the vacuumized containers, means for bringing about separation of the bells and pads, and means for removing the temporarily closed containers from the pads for subsequent permanent sealing, said closure forcing means in each bell comprising a vertically reciprocable chuck having provision for exerting downward pressure on the closures adjacent the peripheries thereof, and said closure lifting means comprising a plurality of gripper fingers carried by the chuck and engageable with the peripheral edges of the closures for lifting and lowering the same, said fingers having hook portions engageable under the peripheral edges of the closures, and spring pin means associated with each chuck and effective during lifting and lowering of closures to engage and hold the closures firmly against the hook portions of the fingers.

21. In a container vacuumizing machine, a rotary turret, a plurality of bells and complementary container supporting pads on the turret, means for feeding onto the pads filled containers having closures loosely resting thereon and including heel portions dimensioned to have tight friction fit in the containers, means for bringing the pads and bells together to enclose the containers therein, means for lifting the closures from the containers within the bells, means for vacuumizing the uncovered containers, means for forcing the closures into tight friction temporary closing contact in the vacuumized containers, means for bringing about separation of the bells and pads, and means for removing the temporarily closed containers from the pads for subsequent permanent sealing, said closure forcing means in each bell comprising a chuck having provision for exerting downward pressure on the closures adjacent the peripheries thereof and mounted on a rod which is vertically reciprocable and extends through the top of the respective bell, a stationary cam having an actuater groove therein, an actuater crank means associated with each rod and having a roller engaged in and controlled as to position by the cam groove, and a yieldable connection in each crank means effective to cause the respective chuck to engage closures with a yielding pressure.

22. In a container vacuumizing machine, a rotary turret, a plurality of bells and complementary container supporting pads on the turret, means for feeding onto the pads filled containers having closures loosely resting thereon and including heel portions dimensioned to have tight friction fit in the containers, means for bringing the pads and bells together to enclose the containers therein, means for lifting the closures from the containers within the bells, means for vacuumizing the uncovered containers, means for forcing the closures into tight friction temporary closing contact in the vacuumized containers, means for bringing about separation of the bells and pads, and means for removing the temporarily closed containers from the pads for subsequent permanent sealing, said closure forcing means in each bell comprising a vertically reciprocable chuck having provision for exerting downward pressure on the closures adjacent the peripheries thereof, the closure lifting means comprising a plurality of gripper fingers carried by the chuck and engageable with the peripheral edges of the closures for lifting and lowering the same, and means in each bell engageable by the chuck fingers as the chuck moves downwardly for spreading the fingers apart and releasing a closure therefrom to fall upon the underlying container.

23. In a container vacuumizing apparatus, a bell, a pad for supporting a filled container having a closure loosely resting thereon and including a heel portion dimensioned to have tight friction fit in the container, said bell and pad being adapted to be brought together in a manner for enclosing the container and its closure within the bell, means for lifting the closure from the container enclosed within the bell, means for vacuumizing the uncovered container, and means for forcing the closure into tight friction temporary closing contact in the vacuumized container for maintaining the container and closure assembly and the evacuated condition of the container until permanent sealing of the container is effected, said closure forcing means comprising a vertically reciprocable chuck having provision for exerting downward pressure on the closures adjacent the peripheries thereof, and said closure lifting means comprising a plurality of gripper fingers carried by the chuck and engageable with the peripheral edges of the closure for lifting and lowering the same.

24. In a container vacuumizing apparatus, a bell, a pad for supporting a filled container having a closure loosely resting thereon and including a heel portion dimensioned to have tight friction fit in the container, said bell and pad being adapted to be brought together in a manner for enclosing the container and its closure within the bell, means for lifting the closure from the container enclosed within the bell, means for vacuumizing the uncovered container, and means for forcing the closure into tight friction temporary closing contact in the vacuumized container for maintaining the container and closure assembly and the evacuated condition of the container until permanent sealing of the container is effected, said closure forcing means comprising a vertically reciprocable chuck having provision for exerting downward pressure on the closures adjacent the peripheries thereof, the closure lifting means comprising a plurality of gripper fingers carried by the chuck and engageable with the peripheral edges of the closures for lifting and lowering the same, said fingers having hook portions engageable under the peripheral edges of the closures, and spring pin means effective during lifting and lowering of closures to engage and hold the closures firmly against the hook portions of the fingers.

25. In a container vacuumizing apparatus, a bell, a pad for supporting a filled container having a closure loosely resting thereon and including a heel portion dimensioned to have tight friction fit in the container, said bell and pad being adapted to be brought together in a manner for enclosing the container and its closure within the bell, means for lifting the closure from the container enclosed within the bell, means for vacuumizing the uncovered container, and means for forcing the closure into tight friction temporary closing contact in the vacuumized container for maintaining the container and closure assembly and the evacuated condition of the container until permanent sealing of the container is effected, said closure forcing means comprising a vertically reciprocable chuck having provision for exerting downward pressure on the closures adjacent the peripheries thereof, and said closure lifting means comprising a plurality of gripper fingers carried by the chuck and engageable with the peripheral edges of the closures for lifting and lowering the same, and means in said bell engageable by the chuck fingers as the chuck moves downwardly for spreading the fingers apart and releasing a closure therefrom to fall upon the underlying container.

26. In a container vacuumizing and gassing machine, a rotary turret, a plurality of bells and complementary container supporting pads on the turret, means for bringing the pads and bells together to enclose containers therein, means for vacuumizing the bells and the enclosed containers, means for introducing an inert gas under pressure into the bells and the enclosed containers, an individual valve associated with each bell for controlling the function of both said vacuumizing and gassing means, and means for closing the valve associated with any bell to which a container has not been fed for preventing the vacuumizing and gassing of any bell in which no container is enclosed, each said individual valve having a rotor equipped with a closing finger extension, an actuator mounted in fixed position and normally out of the path of travel of the closing fingers, and means operable each time there is a break in the feeding of a can to a particular bell to place said actuator in position for engaging the finger extension of the valve of said particular bell so that when said bell approaches said actuator the associated valve will be closed to prevent vacuumizing and gassing of said particular bell.

27. A unitary container vacuumizing, gassing and closing apparatus as defined in claim 2 wherein the closing machine turret has a small number of container receiving stations thereon with each of which is associated a container closing means and wherein the number of chambers in which the vacuumizing, gassing and temporary closing is effected on the vacuumizing and gassing machine turret comprises a multiple of said number of closing machine turret container receiving stations.

ALFRED L. KRONQUEST.

REFERENCES CITED

The following references are of record in the file of this patent:

UNITED STATES PATENTS

| Number | Name | Date |
|---|---|---|
| 601,897 | Michon | Apr. 15, 1898 |
| 737,009 | Norton | Aug. 25, 1903 |
| 762,551 | Norton | June 14, 1904 |
| 1,679,386 | Tenney | Aug. 7, 1928 |
| 1,752,912 | Kronquest | Apr. 1, 1930 |
| 1,770,435 | Seltzer | July 15, 1930 |
| 1,992,556 | Tone | Feb. 26, 1935 |
| 2,302,693 | Hoar | Nov. 24, 1942 |
| 2,397,979 | Peterson et al. | Apr. 9, 1946 |
| 2,411,232 | Sedwick | Nov. 9, 1946 |
| 2,423,975 | Helm | July 15, 1947 |